May 2, 1944.   P. H. KARLSSON ET AL   2,347,829
ROTARY REACTORS
Filed July 4, 1942   2 Sheets-Sheet 1

INVENTOR.
WILLIAM D. YERRICK
BY PER HILMER KARLSSON

ATTORNEY

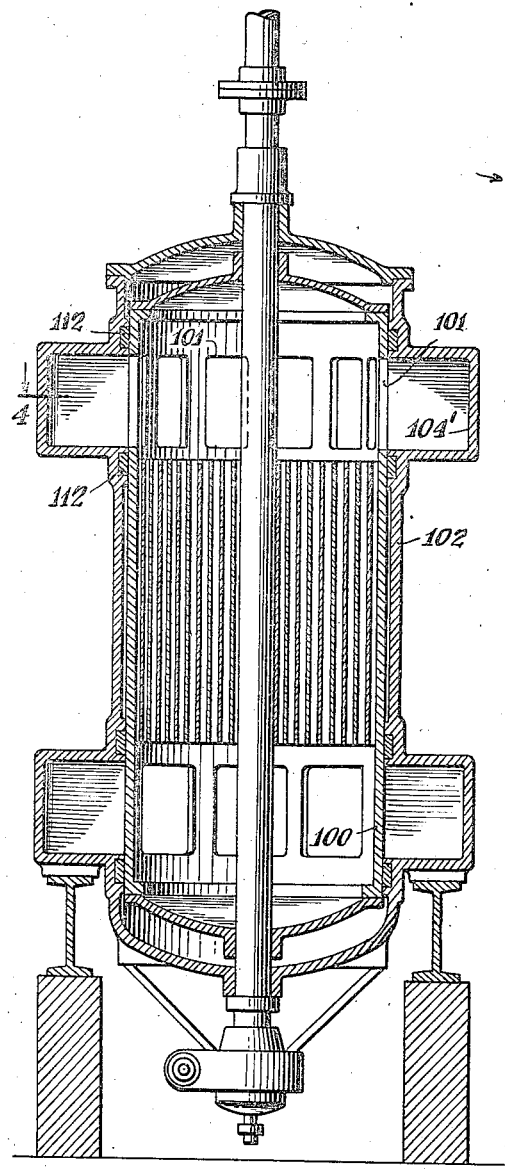
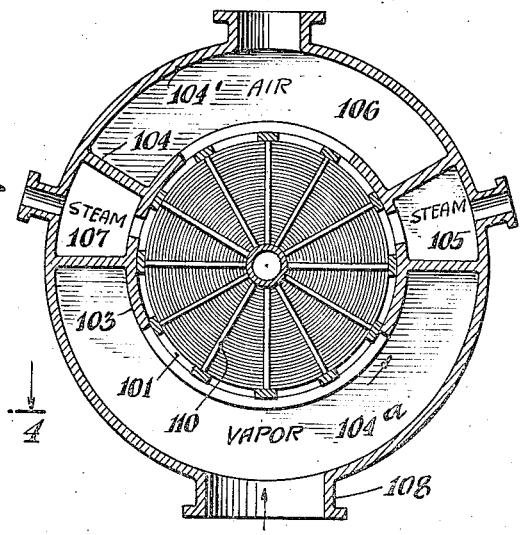
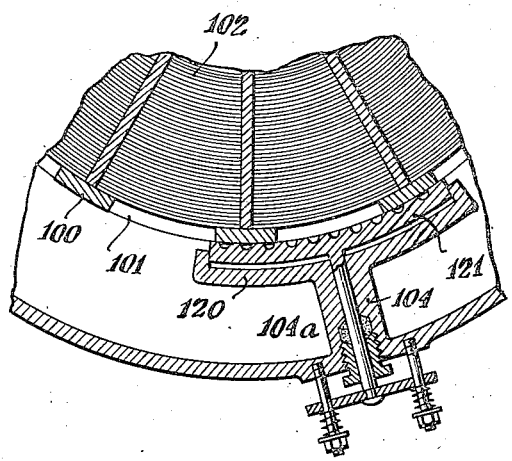

UNITED STATES PATENT OFFICE 2,347,829

ROTARY REACTOR

Per Hilmer Karlsson and William D. Yerrick, Wellsville, N. Y., assignors to The Air Preheater Corporation, New York, N. Y.

Application July 4, 1942, Serial No. 449,760

5 Claims. (Cl. 23—288)

The present invention relates to chemical reactors in which vapors or fluids are brought into contact with a reactant material to effect a chemical reaction.

Chemical reactors of the type to which the present invention is directed embody a rotor divided into a plurality of compartments each containing reactant material through or over which various gaseous fluids are circulated in succession as the rotor turns. Such a reactor may be employed in the treatment of hydrocarbon gases in a reducing process in which hydrocarbon vapors are brought into contact with a catalyst, such as a mass of fuller's earth, which is then contacted by air to burn off the residual carbon and is then purged by circulating steam therethrough. The invention is particularly directed to an improved means for establishing fluid communication between the moving compartments of the rotor and a series of stationary conduits for supplying fluids that are utilized in the reaction.

In the drawings:

Figure 3 is a sectional elevation of a reactor of modified construction;

Figure 4 is a sectional view on the line 4—4 in Fig. 5; and

Figure 5 is an enlarged sectional view illustrating a modified constructional detail for the reactor shown in Figs. 3 and 4.

Figure 1:
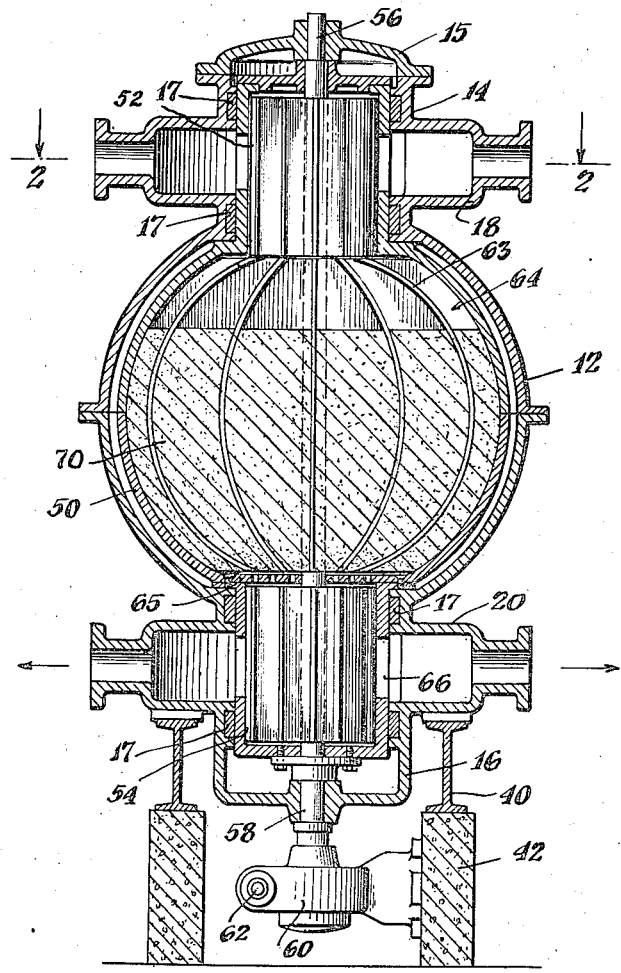
Figure 1 is a sectional view of a chemical reactor of rotary form embodying the present invention.

The reactor comprises a closed stationary housing having a spherical central portion 12 provided at opposite ends with diametrically located bonnets 14 and 16 of cylindrical shape. The bonnets 14 and 16 are formed with hollow annular manifolds 18 and 20 interially divided by partitions 22, 24 and 26 forming separate manifold chambers 28, 30 and 32 to which the hydrocarbon vapor, air for oxidizing the catalyst and steam for purging it are admitted through the pipe connections 34, 36 and 38 respectively. In the form shown the lower manifold 20 rests on beams 40 mounted on the base or other support 42 to support the housing.

Enclosed within the housing is a rotor consisting of a spherical body portion 50 having diametrically opposite cylindrical extensions 52 and 54 that are of reduced diameter and fit within the bonnets 14, 16, respectively, of the housing. The upper cylindrical portion 52 of the rotor is provided with a trunnion 56 journalled in the cover 15 for the upper bonnet 14 of the housing while the lower cylindrical portion 54 of the rotor has a trunnion 58 projecting through the bottom of the lower bonnet 16 and connected through reduction gearing 60 to a driving shaft 62 by means of which the spherical rotor body with its cylindrical extensions may be turned slowly within the stationary housing. The interior of the spherical housing 50 and also of its cylindrical extensions 52, 54 are subdivided by radially extending partitions 63 (Fig. 2) subdividing the interior of the rotor into a plurality of sector shaped compartments which are filled with fuller's earth or other catalytic material supported on a reticulated grid 65 located near the bottom of the spherical portion of the rotor. The side walls of the cylindrical portions 52 and 54 of the rotor are formed with a plurality of openings 66 forming ports by means of which each individual compartment may be placed in communication with the chambers of the annular manifolds 18, 20. For this purpose, the inner walls of the manifolds are formed with ports 29, 31 and 33 located between the dividing partitions 22, 24 and 26, the ports 29 and 31 for the manifold compartments 28 and 30 being of a width to permit simultaneous registration therewith of several ports 66 in the cylindrical extensions of the spherical rotor.

When the sector shaped compartments in the spherical portion of the rotor are filled with a reactant material 70, hydrocarbon vapors admitted through the pipe 34 to the manifold chamber 28 flow radially into the cylindrical extension at the upper end of the rotor and thence axially through a number of sector shaped compartments 64 whose ports 66 then register with the chamber 28. At this time other compartments 64 of the rotor whose ports 66 register with the manifold chamber 30 have air passed therethrough while any rotor compartment 64 registering with the manifold chamber 32 receives steam which purges the catalyst. The various fluids pass radially into the manifold chamber at the bottom of the housing to be discharged through the pipe connected thereto. As the rotor turns counterclockwise (Fig. 2) compartments previously in communication with the manifold chamber for vapor are moved into registration with the manifold chamber for air and subsequently register with the steam manifold 32 before again being moved into registration with the vapor chamber 28. As may be seen in Fig. 2 the inner walls of the manifolds include an imperforate portion located adjacent each of the dividing walls 22, 24, 26 which are of a circumferential extent sufficiently greater than that of the arc subtended by a sector shaped rotor compartment to temporarily cut off the flow of any fluid therethrough so that leakage between the manifold chambers will not occur as a compartment of the rotor moves from registration with one fluid chamber of the manifold to another.

The reactor illustrated in Figs. 3 and 4 has a closed cylindrical rotor 100 with fluid ports 101 formed in its side wall near each end. The central portion of the housing 102 fits closely about the rotor but at each end the housing is provided with projecting annular chambers whose inner walls 103 contact the rotor opposite the ports 101. The inner wall 103 of the housing 102 is formed immediately above and below the manifold chambers with grooves to accommodate the sections of sealing rings 112. Radial webs 104 between the inner wall 103 and the outer wall 104 of these chambers divide them into manifold compartments 104A, 105, 106 and 107 having individual pipe connections 108 for fluid supply or discharge. As in the arrangement previously described, the rotor is divided by radial partitions 110 into a plurality of sector shaped compartments to which fluids are supplied through the related ports 101. The inner wall 103 of each annular chamber of the rotor is formed with ports for alinement with the rotor ports 100 to supply various fluids thereto. The portions of the wall 103 between the ports therein for the sections 104 to 107 are of greater circumferential extent than the width of a rotor compartment so as to prevent cross flow of fluids from one compartment of the annular manifold chamber to another as the rotor turns. The reactant material might be a metal and instead of granular could be in the form of plates spaced to provide fluid passages therebetween as shown in Fig. 3.

In the alternative construction shown in Fig. 5, the webs 104 dividing the fluid supply chamber into various sections are provided with flange sections 120 parallel to the rotor and of greater width than the rotor compartments. Each section 120 is recessed on its inner face to form a seat for a sealing shoe 121 bearing against the outer wall of the rotor 100 so as to prevent leakage of fluid from one section of the annular chamber through a rotor compartment alined therewith into the next section of the annular chamber. As illustrated the sealing shoes 121 are resiliently held against the rotor wall. In this construction the manifold chambers at the ends of the rotor need not have an inner wall as in Fig. 4 and the wall 102 of the housing may be extended outwardly to provide the outer wall 104 of the manifold chambers.

The radial flow of fluids to and from the rotor compartments, or, more specifically, the arrangement of ports in vertical side wall parts of the rotor and manifold is advantageous inasmuch as friction and wear is minimized between the contacting parts of the rotor and housing that cooperatively function as valve elements. This is because the upper manifold does not rest upon the ported surface of the rotor nor the lower ported neck of the latter bear down upon the ported surface of the lower manifold. As a consequence the fluid seals between the stationary and rotary parts are more effective and more readily maintained.

Figure 2:
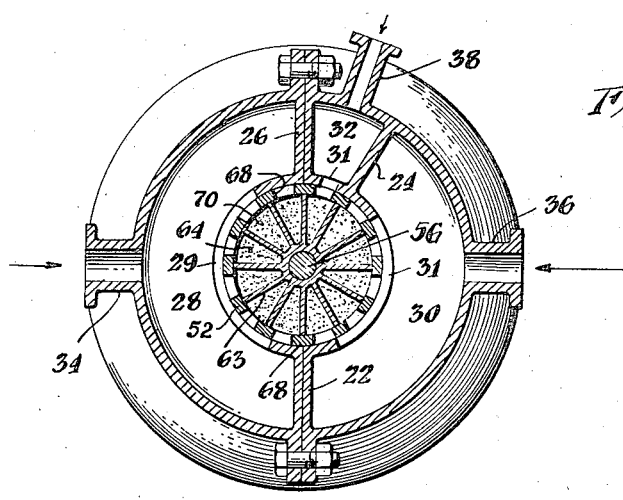
Figure 2 is a sectional view on the line 2—2 in Fig. 1.

Further, in the form of Figs. 1 and 2 the provision of the reduced necks that are formed by the cylindrical extensions of the spherical rotor also reduces the areas of sliding contact between the moving parts and thereby lessen the sealing problem because smaller circumferential seals which are easier to maintain may be provided.

What we claim is:

1. In chemical reaction apparatus adapted to contain chemically reactant material for contact by fluid; a closed, hollow rotor divided by radial partitions into a plurality of compartments; a pair of valve ports for each compartment formed in the side wall of the rotor and spaced axially thereof; a stationary housing surrounding said rotor; a plurality of fluid supply and fluid discharge connections at opposite ends of said housing; means including a shaft to which said rotor is attached for turning the latter to aline said valve ports with said fluid supply and discharge connections in succession; and radial walls intermediate said connections extending from the inner wall surface of said housing to positions closely adjacent said rotor to form a plurality of fluid supply chambers in said housing.

2. In chemical reaction apparatus adapted to contain chemically reactant material for contact by fluid; a closed, hollow rotor divided by radial partitions into a plurality of compartments; a pair of valve ports for each compartment formed in the side wall of the rotor and spaced axially thereof; a stationary housing surrounding said rotor; a plurality of fluid supply and fluid discharge connections at opposite ends of said housing; means including a shaft to which said rotor is attached for turning the latter to aline said valve ports with said fluid supply and discharge connections in succession; radial walls intermediate said connections extending from the inner wall surface of said housing to positions closely adjacent said rotor to form a plurality of fluid supply chambers in said housing; sealing means mounted between the inner end of said radial walls and said outer wall surface of said rotor opposite the location of said ports, said sealing means being of greater circumferential extent than that of the rotor wall ligaments between ports therein; and means for maintaining said sealing means in contact with said rotor.

3. In apparatus of the type described; a closed, hollow vertically disposed rotor divided interially by transverse radial partitions into a plurality of compartments; reactant material in said compartments to be contacted by fluid circulated therethrough; a pair of axially spaced ports for each compartment formed in the side wall of the rotor adjacent the ends thereof; a stationary housing enclosing said rotor; a plurality of fluid supply and discharge connections at each end of said housing formed with ports facing said rotor ports; and means including a vertical shaft to which said rotor is attached for turning the latter to aline its ports with those of said fluid supply and discharge connections in succession for causing radial flow of fluids to and from said compartments and through the latter in contact with the reactant material therein.

4. In apparatus of the type described; a rotor shaft; a hollow closed rotor attached thereto and divided by radial partitions into a plurality of compartments; reactant material in said compartments to be contacted by fluid circulated therethrough; inlet and outlet ports for each compartment spaced axially in the outer side wall of said rotor; a stationary housing enclosing said rotor; a plurality of fluid supply and fluid discharge manifolds located spaced circumferentially of said housing opposite said rotor ports, each manifold having a port communicating with one or more ports in said rotor; and means for turning said rotor to aline the ports for each compartment with the ports of said manifolds in succession.

5. In apparatus of the type described; a vertical rotor shaft; a closed, hollow rotor attached thereto and divided by radial partitions into a plurality of compartments; reactant material in said compartments to be contacted by fluid circulated therethrough; a pair of ports for each compartment spaced axially in the outer side wall of said rotor; a stationary housing enclosing said rotor; fluid supply and discharge manifolds spaced about either end of said housing each having their inner walls shaped to conform to the exterior contour of the outer wall of said rotor in the region of its ports and formed with a port for alinement with one or more of said rotor ports; and means for turning said rotor to aline the port of each manifold in succession with ports of the various rotor compartments.

PER HILMER KARLSSON.
WILLIAM D. YERRICK.